April 7, 1964  E. E. KOCH  3,127,778
RATCHET DRIVE SAFETY RELEASE
Filed June 26, 1961
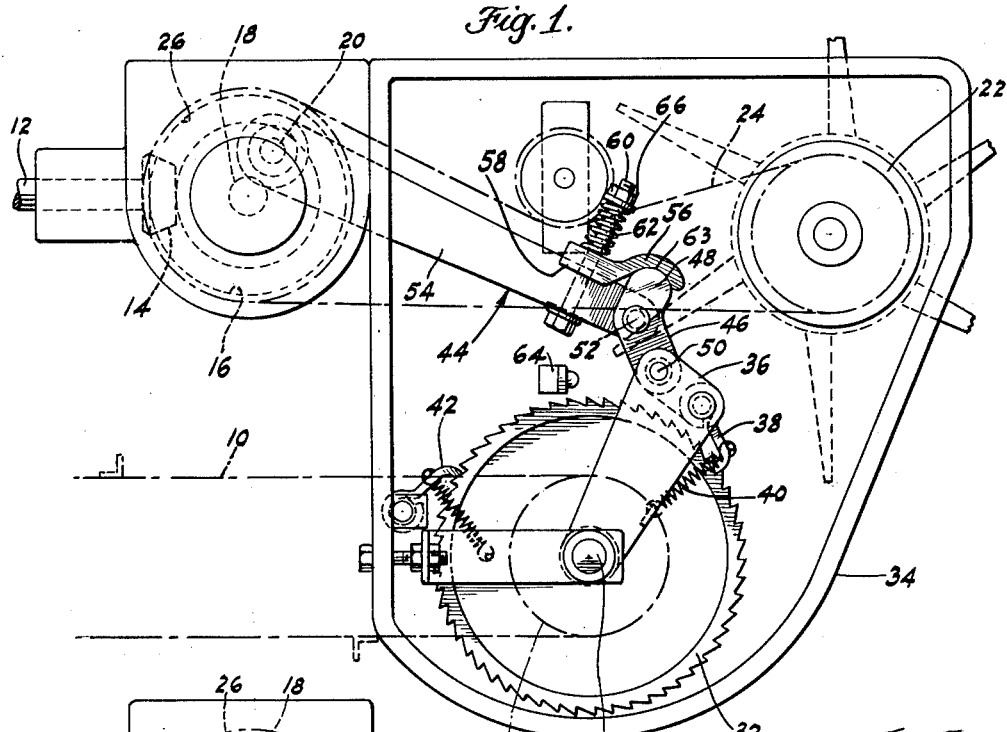
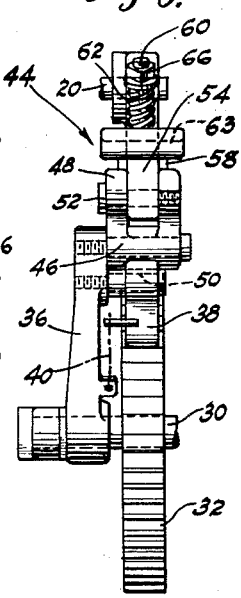
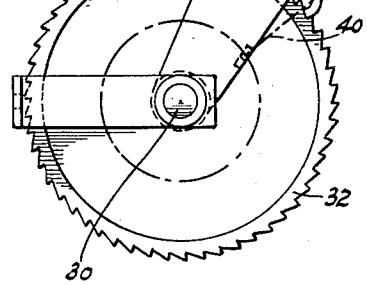
INVENTOR
EARL E. KOCH
BY
ATTORNEY __United States Patent Office__ 3,127,778
Patented Apr. 7, 1964

3,127,778
RATCHET DRIVE SAFETY RELEASE
Earl E. Koch, Mohnton, Pa., assignor to Sperry Rand Corporation, New Holland, Pa., a corporation of Delaware
Filed June 26, 1961, Ser. No. 119,702
6 Claims. (Cl. 74—116)

This invention relates to ratchet drive mechanism especially designed for operating the feed apron or chains of a manure spreader and, more particularly, to safety means provided in the ratchet drive mechanism so as to permit release of certain elements of the drive mechanism and thereby prevent damage thereto and also prevent injury to any other parts of the mechanism, especially when any one of a number of situations effect resistance to the movement of the feeding apron or chains of the spreader.

As is well known, manure spreaders usually include a flexible movable apron which underlies the load of manure, or a pair of chains having transverse bars extending therebetween slide along the bottom surface of a manure spreader. As the spreader moves over the ground upon which the manure is to be spread, said flexible apron or chains gradually are moved so as to propel the entire load of manure toward the rear or discharge end of the spreader. For many years, it has been customary to drive said flexible apron or chains by ratchet means including a ratchet gear fixed to the shaft upon which either an elongated drum or sprocket gears are mounted and around which the flexible apron or chains respectively move adjacent the rear end of the spreader.

Under normal operation of a manure spreader, said flexible apron or chains slowly are propelled by suitable drive mechanism to move the upper courses of the apron or chains progressively rearwardly of the spreader, whereby cutting and disintegrating mechanism conventionally carried by the spreader at the discharge end thereof disintegrates the bulk of manure and broadcasts the same over a substantial width of ground as the spreader progressively is propelled thereover by suitable power means such as a tractor. The driving or actuating mechanism for the flexible apron or chains usually is from one or two possible sources. One of these is the axle for the rear wheels of the spreader, and the other is from a P.T.O. on the propelling tractor. Regardless of the source of power however, said power usually is transmitted to the load-moving belt or chain by a ratchet drive which includes a crank, a pawl-carrying arm oscillatable about the axis of the ratchet gear referred to above, and a pitman extending between the crank and the pawl-carrying arm.

Any one of a number of causes can result in the load-moving apron or chains resisting movement thereof by the ratchet drive mechanism of the manure spreader. In cold weather, freezing conditions can cause the apron or chains to freeze to the floor or bed of the manure spreader, for example. Overloading the manure spreader likewise can cause substantial resistance to such movement of the apron or chains. In addition, commencing the unloading of the manure at too rapid a rate of feed, especially when unloading a heavy load, likewise can cause undue impedance to movement of the apron or chains by the drive mechanism. Regardless of the cause of the impedance however, when the load-moving apron or chains offer resistance in excess of a predetermined amount to the power imposed upon the ratchet drive mechanism, some portion of the mechanism is due to be injured or broken unless suitable safety means are provided.

Heretofore, it has been common to use a shear-pin in an appropriate part of the feed mechanism, such as between the ratchet gear and the shaft to which it is connected. While this is effective for preventing damage to the spreader and especially the drive mechanism, nevertheless, substantial time is lost and it otherwise is a nuisance and frequently somewhat difficult to replace shear-pins of this type. Unless the farmer happens to carry an extra shear-pin with him, for example, as well as the tools necessary to replace the same, it is necessary either to bring the loader back from the field to a suitable location to effect repair or the farmer has to walk back from the field to get the necessary equipment and replacement shear-pin.

Certain forms of additional safety means also have been provided heretofore but, for the most part, the equipment of this type has been expensive, complex and costly to manufacture and install as well as requiring manual operation to reset the same to operative position.

It is the principal object of the present invention to provide a ratchet drive mechanism for the apron or chains of a manure spreader with safety release mechanism of very simple, inexpensive, and reliable nature, comprising a minimum of parts and being fool-proof in operation.

Another object of the invention is to provide said safety release mechanism on the pitman which extends between the crank and pawl-carrying arm, whereby upon an obstruction or impedance in the movement of the load-moving apron or chains in excess of a predetermined amount occurring, the pitman may be "broken," whereby the opposite ends thereof can be foreshortened and, as a result, the driving stroke of the crank is rendered momentarily ineffective to move the pawl-carrying arm of the feed mechanism in feeding direction.

A further object of the invention is to utilize automatically operable cam means in the safety release mechanism of the type referred to above and, in the preferred construction of the invention, said cam mechanism is double-acting, whereby not only is the safety release mechanism operable to render the drive stroke of the mechanism ineffective so as to prevent injury to the mechanism but said cam means also readily permits the pitman to be restored to normal operative condition, automatically, during the non-driving stroke of the crank of the driving mechanism.

A still further object of the invention is to employ in the safety relief mechanism of the type referred to above a simple latch carried by one arm of an articulated pitman, said latch engaging cam means carried by a second arm of the articulated pitman, the engagement between the latch and cam normally being such as to prevent relative movement therebetween such as would permit contracting of the length of the pitman, as well as permitting restoration of the pitman to full effective operative length, all of such movement being effected automatically without requiring any manual exertion on the part of the operator of the spreader.

Details of the foregoing objects and of the invention, as well as other objects thereof, are set forth in the following specification and illustrated on the drawing comprising a part thereof.

In the drawing:

FIG. 1 is a fragmentary side elevation of a portion of the rear or feeding end of a conventional manure spreader, said view showing the ratchet drive mechanism for the load-moving apron or chains of the spreader which are illustrated in phantom, said drive mechanism embodying the principles of the present invention and showing the pitman of the drive mechanism in operative position.

FIG. 2 is a view similar to FIG. 1 but somewhat more simplified primarily to illustrate the released or contracted position of the safety release mechanism on the pitman, whereby the pitman is shown in said figure in contracted position.

FIG. 3 is an end view of the ratchet drive mechanism shown in FIG. 2.

Referring to the drawing and especially FIG. 1, it will be understood that the mechanism illustrated therein is mounted at the rear or delivery end of a conventional manure spreader. The load-moving flexible apron or chains 10 are symbolically illustrated in phantom. Such flexible means move along the conventional bottom or bed of the spreader and the propelling of the upper course of said flexible means toward the rearward end of the spreader is effected by the ratchet drive mechanism comprising the present invention. Said drive mechanism is actuated by an exemplary rotary drive shaft 12 which derives power from any suitable source such as a P.T.O. of a tractor which propels the manure spreader, or the axle for the rear wheels of the spreader, neither of which are illustrated. Shaft 12 has a bevel pinion gear 14 connected thereto which meshes with the diagrammatically illustrated bevel gear 16 supported by shaft 18. Also carried by bevel gear 16 is a crank pin 20.

Mounted at the rearward end of the manure spreader shown in FIG. 1 is a rotary beater 22 which is driven by a suitable flexible sprocket chain 24, for example, the chain being driven by a suitable sprocket gear 26 carried by shaft 18. The rear or delivery portion of the load-moving apron or chains 10 passes around either an elongated drum or pair of sprocket gears 28, the same being supported by shaft 30 which is rotatable about a fixed axis relative to the frame of the spreader. A toothed sprocket gear 32 is fixed to one end of said shaft and preferably, is positioned within a housing 34.

Also contained within the housing is an oscillatable pawl-carrying arm 36, one end of which has a bearing through which the shaft 30 extends, whereby said end of the arm 36 is oscillatable coaxially with the ratchet gear 32. The opposite end of the arm 36 movably supports a ratchet pawl 38, the outer end of which is urged into operative engagement with the teeth of the ratchet gear 32 by means of a suitable coiled spring 40. To insure that the ratchet gear 32 will not move in retrograde direction when the arm 36 and pawl 38 are moving in nonfeeding direction, a conventional holding pawl 42 is provided within the housing 34 to engage the teeth of the sprocket gear 32 and prevent such retrograde movement, while not interfering with the movement of the ratchet gear in feeding direction.

Extending between the crank pin 20 and the outer end of the pawl-carrying arm 36 is a pitman 44 of a type arranged to be "broken." Said pitman comprises a pair of articulated arms. One arm 46 preferably is quite short and has an angular extension 48 projecting from one end thereof, said extension terminating in a rounded end comprising a cam. The end of the arm 46 opposite that from which the extension 48 projects is pivotally connected by a pin 50 to the other end of arm 36. The end of arm 46 which has the cam extension 48 thereon is pivotally connected by a pin 52 to one end of another arm 54 comprising part of the articulated broken pitman 44. The opposite end of said another arm 54 is apertured to receive the crank pin 20.

Referring to FIG. 1, the articulated pitman 44 is shown in its normal or extended operative position. In this position, it will be seen that said one arm 46 extends at an acute angle to the longitudinal axis of said another arm 54. Also, it will be seen that, in this position of the pitman 44, the angular extension 48 is substantially perpendicular to the longitudinal axis of said another arm 54.

For purposes of maintaining the two arms 46 and 54 of the pitman normally in the operative or extended positions thereof relative to each other, as shown in FIG. 1, yieldably supported latch means 56 are provided, preferably carried by arm 54. It will be seen that the latch means 56 has a leg 58 which overlies the upper surface of arm 54 and is apertured to receive pin 60 which, preferably, comprises a bolt extending through a suitable transverse hole in arm 54. Also surrounding pin 60 is a compression spring 62 which engages the upper surface of leg 58 of the latch means 56, thereby yieldably holding the leg 58 of said latch means against the arm 54.

Latch means 56 also comprises a concaved portion 63 which is substantially complementary to the rounded contour of cam extension 48. It will be seen in FIG. 1 that the extension 48 is closely received within the concaved portion 63 of latch means 56, whereas in FIG. 2, the cam extension 48 has been removed from engagement with the concaved portion 63. Thus, in FIG. 2, it will be seen that the articulated pitman is in the so-called "broken" or contracted position as compared with the normal or extended position thereof illustrated in FIG. 1.

It also will be seen, particularly from FIGS. 1 and 2, that the surface of cam projection 48 and the co-engaging concave surface 63 of latch means 56 are double-acting in that the cam projection 48 may be moved to the right, as viewed in FIG. 1, relative to the concaved portion 63 of latch means 56, particularly when impedance in excess of a predetermined amount is exerted against the load-moving apron or chains 10 and driving force is imposed by crank 20 upon the pitman 44 of such magnitude that the force of spring 62 is exceeded, thereby permitting the cam extension 48 to move from engagement with the concaved portion 63 of latch means 56. Following this, when the crank pin 20 moves beyond the dead center position shown in FIG. 2 and continues clockwise movement, the pitman then will be moving in non-driving direction and will move the pawl-carrying arm 36 and pawl 38 in retracting direction relative to the ratchet gear 32.

As seen in FIG. 1, a stop member 64 is positioned fixedly relative to housing 34 as well as the axis of shaft 30 and, upon the upper end of the pawl-carrying arm 36 nearing the end of its movement in retracting direction, it will engage stop member 64 so as to halt the arm 36. However, dimensions are such that further movement of the pitman 44 in retracted direction by crank pin 20 is possible and will result in the cam extension 48 engaging the outer end of the concaved portion 63 of latch means 56, whereby the outer extension of concaved portion 63 will be moved away from arm 54, against the action of spring 62, to permit the cam extension 48 to be fully received within the concaved portion 63 of the latch means, as shown in FIG. 1. It will be understood that the outer extremity of the concaved portion 63, when in the position shown in FIG. 1 relative to cam extension 48, preferably will somewhat overhang said cam extension.

It will be understood further that the force to be exerted by spring 62 can be regulated by the nut 66 threaded on the outer end of pin or bolt 60. Accordingly, the amount of force which will be sustained by the pitman 44 in its normal operative position, before "breaking" of the arms 46 and 54 thereof to their contracted position illustrated in FIG. 2, is variable within appreciable limits. Accordingly, the latch means 56 can be rendered effective to maintain the pitman 44 in its driving position such as shown in FIG. 1 under a wide range of requirements for driving force, as determined by the operator, before the safety release mechanism of the pitman operates to permit movement of the arms of the pitman to the contracted position thereof. Also, the double action nature of the cam extension 48 and the latch means 56 cooperating therewith permits automatic restoration of the pitman from its so-called "broken" position, illustrated in FIG. 2, to its normal operative position shown in FIG. 1, especially by the use of the stop member 64 which engages the pawl-carrying arm 36.

Particularly by reference to FIG. 3, it will be seen that the concaved portion 63 of the latch means 56 is relatively wide in a transverse direction so as to engage the cam extension 48 of the one arm 46 of the articulated pitman 44. Preferably, the cam extension 48 is bifurcated to receive between the legs thereof the outer end of said another arm 54 of the pitman 44. Such arrangement not only provides rigidity and substantial strength to the connection between the arms 46 and 54 of the pitman but, additional frictional surface is provided by arranging the cam extension 48 in the nature of a pair of legs respectively engageable with spaced complementary surface portions of the concaved portion 63 of the latch means 56.

While the invention has been described and illustrated in its several preferred embodiments, it should be understood that the invention is not to be limited to the precise details herein illustrated and described since the same may be carried out in other ways falling within the scope of the invention as claimed.

I claim:

1. Ratchet drive mechanism for the movable apron or chains of a manure spreader movably mounted to effect feeding of manure to the discharge end of the spreader and passing around rotatable supporting and actuating means, said drive means comprising, a toothed ratchet gear connectable to said rotatable supporting and actuating means, a pawl arm oscillatably supported at one end substantially coaxially with said gear, a pawl movably carried by the opposite end of said pawl arm and engageable with the teeth of said gear, and a crank supported for rotation about an axis fixed relative to the axis of said gear, in combination with a broken pitman extending between said crank and pawl arm and connected respectively at its opposite ends thereto, said broken pitman comprising two arms each having one end permanently pivotally connected together and one of said arms being at an acute angle to the axis of the other arm, whereby said pivotal connections are not in a straight line, and releasable cam-like latch means on one of said pitman arms engageable releasably with a portion of the other pitman arm normally to hold said pitman arms in extended driving condition but said latch means being yieldable to permit breaking of said pitman and movement of the ends of the arms thereof to a contracted position upon said apron or chains resisting forces applied by said drive means in feeding direction in excess of a predetermined amount, said cam-like latch means also being operable to effect re-engagement of said latch means with said one pitman arm when the arms of said broken pitman are extended during retracting movement of the crank.

2. The ratchet drive mechanism set forth in claim 1 further including means yieldably holding a portion of said latch means in engagement with said portion of said other pitman arm for release thereof from said latch means to permit breaking of said pitman about the pivotal connection of the two pitman arms upon forces in excess of a predetermined amount being exerted upon one end of said pitman toward the other end thereof.

3. Ratchet drive mechanism for the movable apron or chains of a manure spreader movably mounted to effect feeding of manure to the discharge end of the spreader and said apron or chains passing around supporting and actuating means rotatably carried by said spreader, said drive means comprising a toothed ratchet gear connectable to said rotatable supporting and actuating means, a pawl arm supported oscillatably at one end substantially coaxially with said gear, a pawl movably carried by the opposite end of said pawl arm and engageable with the teeth of said gear, and a crank supported for rotation about an axis fixed relative to the axis of said gear, in combination with a broken pitman comprising one arm pivotally connected at one end to said pawl arm and another arm permanently pivotally connected at one end to the other end of said one arm and at its opposite end being pivotally connected to said crank for driving said pitman to actuate said pawl to drive said gear in one rotary direction, said one arm being at an acute angle to the axis of said another arm, an extension on said one arm adjacent the end thereof pivoted to said another arm, said extension extending normally substantially transversely to the axis of said another arm and terminating in a cam, and latch means carried yieldably by said another arm and engaging said cam means of said extension on said one arm yieldably to permit relative movement of said arms to a contracted position upon said apron or chains resisting forces applied by said drive means in feeding direction in excess of a predetermined amount, said latch means being automatically restored to engagement with said cam to effect normal positioning of said arms of said broken pitman with respect to each other when said arms are extended during the retracting movement of said crank.

4. The ratchet drive mechanism set forth in claim 3 further characterized by said latch having a leg held yieldably against said another arm and a concaved portion receiving said cam of said one arm, said cam being slidable relative to said concaved surface when movement is effected between said arms.

5. The ratchet drive mechanism set forth in claim 4 further characterized by said another arm having a pin extending transversely therefrom and through said latch, and spring means carried by said pin and engaging one surface of said latch to hold the concaved portion thereof yieldably against said cam of said one arm.

6. The ratchet drive mechanism set forth in claim 3 further characterized by said latch and cam being double acting respectively to permit said broken pitman both to contract and also be extended to normal operating condition, whereby said cam is re-engaged by said latch when said pitman is extended to normal operating condition, and stop means fixed relative to the axis of said pawl arm and positioned to be engaged by said pawl arm during movement thereof in non-driving direction prior to the end of the movement of the crank in non-driving direction, thereby to insure reengagement of said latch and cam to restore said broken pitman to normal driving condition.

References Cited in the file of this patent

UNITED STATES PATENTS

| | | |
|---|---|---|
| 1,262,479 | Gardner | Apr. 9, 1918 |
| 1,662,657 | Alperu | Mar. 13, 1928 |
| 1,738,409 | Weingartner | Dec. 3, 1929 |
| 1,863,771 | Snow | June 21, 1932 |
| 2,699,337 | Best | Jan. 11, 1955 |